United States Patent
Matsen et al.

(10) Patent No.: US 8,963,058 B2
(45) Date of Patent: Feb. 24, 2015

(54) SYSTEM AND METHOD OF ADJUSTING THE EQUILIBRIUM TEMPERATURE OF AN INDUCTIVELY-HEATED SUSCEPTOR

(75) Inventors: Marc R. Matsen, Seattle, WA (US); Mark A. Negley, Bellevue, WA (US); William Preston Geren, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 631 days.

(21) Appl. No.: 13/305,297

(22) Filed: Nov. 28, 2011

(65) Prior Publication Data

US 2013/0134154 A1 May 30, 2013

(51) Int. Cl.
H05B 6/10 (2006.01)
H05B 6/00 (2006.01)

(52) U.S. Cl.
USPC ............................ 219/634; 219/618; 219/633

(58) Field of Classification Search
CPC .... B01J 12/007; C01B 31/0233; C23C 16/46; H05B 2206/023; H05B 6/105; B29C 35/0805
USPC ......... 219/600, 601, 602, 619, 633, 725, 730, 219/731, 759, 634
See application file for complete search history.

(56) References Cited

U.S. PATENT DOCUMENTS

| | | | |
|---|---|---|---|
| 3,706,176 A * | 12/1972 | Leatherman | 53/488 |
| 3,941,641 A * | 3/1976 | Heller et al. | 156/272.4 |
| 4,541,891 A * | 9/1985 | Leatherman | 156/379.6 |
| 5,645,744 A | 7/1997 | Matsen et al. | |
| 5,660,669 A * | 8/1997 | Mittleider | 156/273.7 |
| 5,710,413 A * | 1/1998 | King et al. | 219/633 |
| 5,723,849 A | 3/1998 | Matsen | |
| 5,728,309 A | 3/1998 | Matsen | |
| 5,760,379 A * | 6/1998 | Matsen et al. | 219/633 |
| 5,808,281 A | 9/1998 | Matsen | |
| 6,091,063 A * | 7/2000 | Woods | 219/645 |
| 6,323,468 B1 * | 11/2001 | Dabelstein et al. | 219/617 |
| 6,528,771 B1 | 3/2003 | Matsen | |
| 6,566,635 B1 * | 5/2003 | Matsen et al. | 219/633 |
| 6,906,300 B2 * | 6/2005 | Brown et al. | 219/759 |

(Continued)

FOREIGN PATENT DOCUMENTS

JP 2011110719 6/2011

OTHER PUBLICATIONS

European Search Report dated Apr. 24, 2013, Application No. 12193390.7-1706.

(Continued)

*Primary Examiner* — Dana Ross
*Assistant Examiner* — Gyounghyun Bae

(57) ABSTRACT

A system for inductively heating a workpiece may include an induction coil, at least one susceptor face sheet, and a current controller coupled. The induction coil may be configured to conduct an alternating current and generate a magnetic field in response to the alternating current. The susceptor face sheet may be configured to have a workpiece positioned therewith. The susceptor face sheet may be formed of a ferromagnetic alloy having a Curie temperature and being inductively heatable to an equilibrium temperature approaching the Curie temperature in response to the magnetic field. The current controller may be coupled to the induction coil and may be configured to adjust the alternating current in a manner causing a change in at least one heating parameter of the susceptor face sheet.

8 Claims, 13 Drawing Sheets

(56) References Cited

U.S. PATENT DOCUMENTS

| | | |
|---|---|---|
| 6,914,225 B2 | 7/2005 | Fischer |
| 6,979,807 B2* | 12/2005 | Anderson et al. .............. 219/757 |
| 7,905,128 B2* | 3/2011 | Matsen et al. ..................... 72/60 |
| 2005/0035115 A1 | 2/2005 | Anderson et al. |
| 2006/0125623 A1* | 6/2006 | Appelt et al. ................. 340/521 |
| 2007/0068933 A1* | 3/2007 | Wilkes et al. ................. 219/633 |
| 2008/0128078 A1 | 6/2008 | May et al. |
| 2009/0074905 A1 | 3/2009 | Matsen et al. |
| 2009/0127253 A1 | 5/2009 | Stark et al. |
| 2010/0065552 A1 | 3/2010 | Matsen |
| 2011/0006460 A1 | 1/2011 | Wander Wel |
| 2011/0139769 A1 | 6/2011 | Miller et al. |
| 2011/0229720 A1 | 9/2011 | Matsen |

OTHER PUBLICATIONS

U.S. Appl. No. 13/097,846, Smart Heating Blanket, filed Apr. 29, 2011.

* cited by examiner

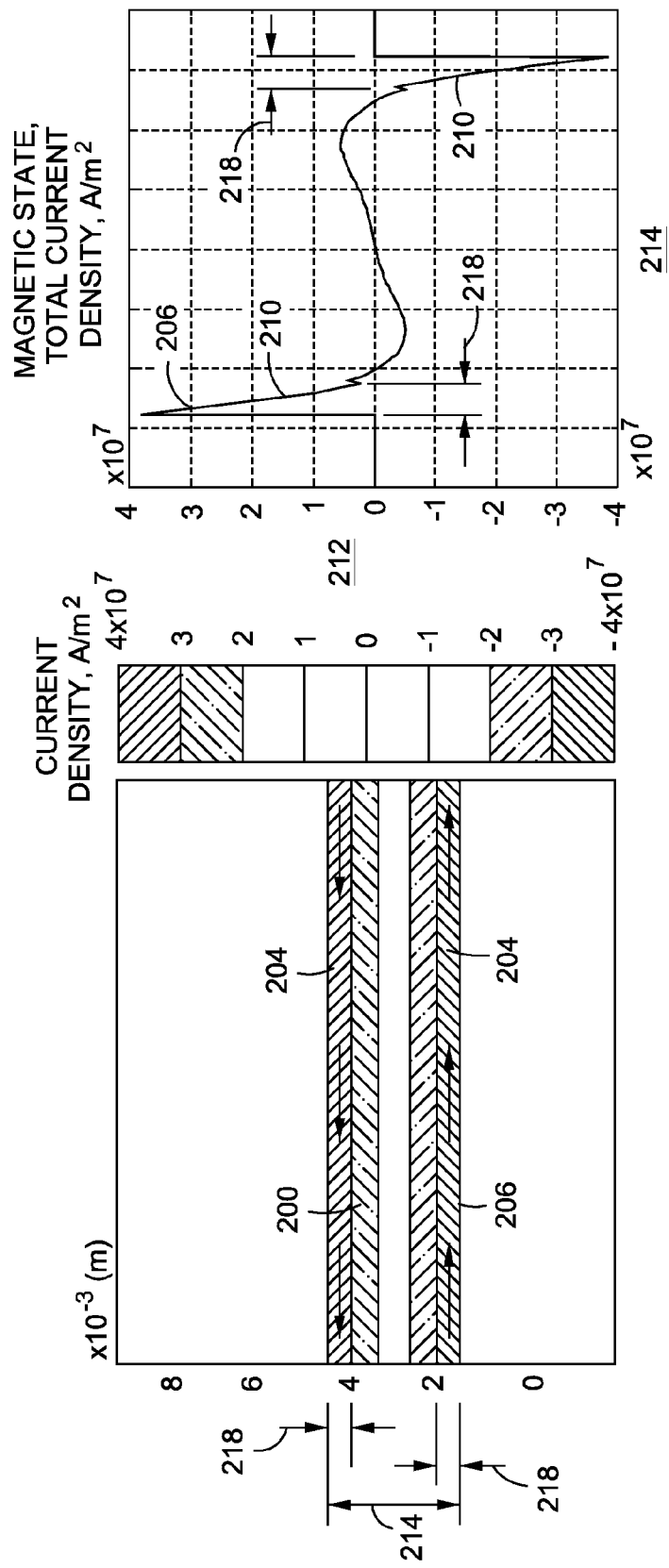

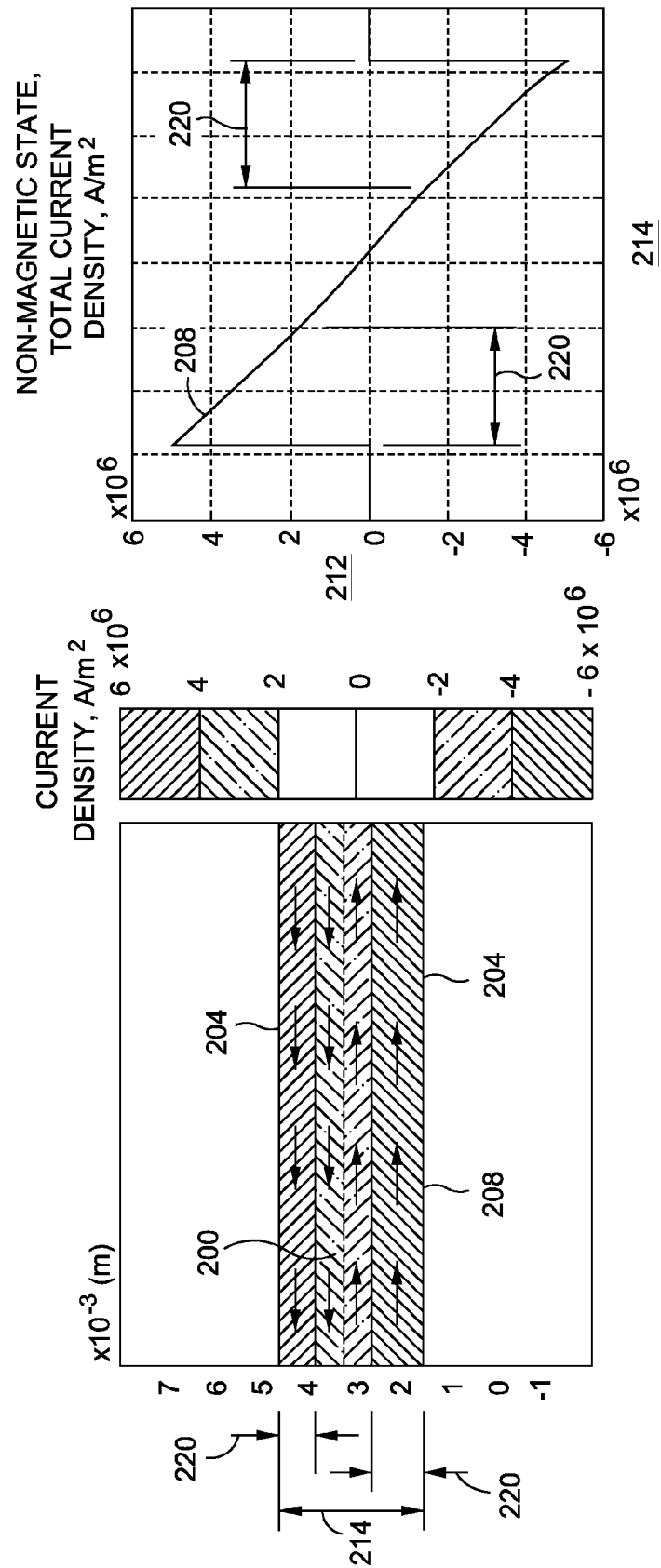

SYSTEM AND METHOD OF ADJUSTING THE EQUILIBRIUM TEMPERATURE OF AN INDUCTIVELY-HEATED SUSCEPTOR

STATEMENT RE: FEDERALLY SPONSORED RESEARCH/DEVELOPMENT

This invention was made with Government support under contract number DE-FG36-08GO18135 awarded by the United States Department of Energy. The government has certain rights in this invention.

FIELD

The present disclosure relates generally to composites and, more particularly, to the heating of thermoplastic articles during the forming of such articles.

BACKGROUND

The forming of composite articles typically requires heating a preform while applying compressive force during consolidation of the preform. When heating the preform, it is typically desirable to maintain the preform at an elevated temperature and within a relatively narrow temperature range corresponding to the material system or resin composition of the preform so that the desired mechanical properties will be achieved in the final article. When forming a thermoplastic article, it may be necessary to heat the preform above the melting temperature of the thermoplastic resin such that the resin may flow throughout the preform during consolidation.

To achieve the desired mechanical properties in the thermoplastic article, it may also be necessary to thermally cycle the preform by reducing the temperature of the preform from the melting temperature to a second, lower temperature and maintain the preform at the second temperature for a predetermined time period. By maintaining the preform at the second temperature for the predetermined time period, the desired level of crystallinity may be achieved in the thermoplastic article which may affect the mechanical properties of the final article. The mechanical properties of the final thermoplastic article may also be affected by the rate at which the preform is heated and/or cooled during thermal cycling.

Conventional techniques for forming composite articles include the use of an autoclave and conventional tooling for consolidating the preform and forming the preform in the desired shape. Unfortunately, autoclaves and tooling typically have relatively large thermal masses which results in a significant amount of time for initially heating the preform to the melting point. In addition, the relatively large thermal mass of an autoclave and tooling results in a significant amount of time for the article to cool during thermal cycling. Furthermore, the relatively large thermal mass of the autoclave and tooling reduces the ability to maintain the article at the desired temperatures for the specified time periods to achieve optimal mechanical properties in the final article.

Additional drawbacks associated with the use of autoclaves and conventional tooling include difficulty in applying heat to the article in a uniformly-distributed manner due to the relatively large thermal mass of the autoclave and tooling. Furthermore, the large thermal mass of the autoclave and tooling results in relatively long time periods to allow the article to cool to a temperature safe for handling. In addition, autoclaves consume relatively large amounts of electrical power during the initial heating of the autoclave interior and the tooling.

As can be seen, there exists a need in the art for a system and method for heating a preform that provides a high level of controllability of the temperature to which the preform is heated. In addition, there exists a need in the art for a system and method that facilitates heating and cooling a preform in a relatively short period of time and in a controlled manner such that the mechanical properties of the final article may be optimized. Furthermore, there exists a need in the art for a system and method for heating a preform that results in the uniform distribution of heat throughout the preform. Preferably, such a system and method may be operated in an energy-efficient and cost-effective manner.

SUMMARY

The above-noted needs associated with heating articles with a high level of temperature controllability are specifically addressed by the present disclosure which provides a system for inductively heating a workpiece. In an embodiment, the system may include an induction coil, at least one susceptor face sheet, and a current controller. The induction coil may be configured to conduct an alternating current and generate a magnetic field in response to the alternating current. The susceptor face sheet may be configured to have a workpiece positioned therewith. The susceptor face sheet may be formed of a ferromagnetic alloy having a Curie temperature and being inductively heatable to an equilibrium temperature approaching the Curie temperature in response to the magnetic field. The current controller may be coupled to the induction coil and may be configured to adjust the alternating current in a manner causing a change in at least one heating parameter of the susceptor face sheet.

Also disclosed is a method of inductive heating of a workpiece including the step of applying alternating current to an induction coil having at least one susceptor face sheet mounted adjacent thereto wherein the susceptor face sheet may be formed of a ferromagnetic alloy having a Curie temperature. The method may further include generating a magnetic field and inductively heating the susceptor face sheet to an equilibrium temperature approaching the Curie temperature in response to the magnetic field. The method may also include adjusting at least one current parameter of the alternating current and shifting the equilibrium temperature of the susceptor face sheet in response to adjusting the current parameter.

In a further embodiment, disclosed is a method of inductively heating a workpiece and which may include applying alternating current to an induction coil having a susceptor face sheet mounted adjacent thereto. The susceptor face sheet may be formed of a ferromagnetic alloy having a Curie temperature. The method may further include generating a magnetic field along the susceptor face sheet in response to the alternating current and inductively heating the susceptor face sheet to an equilibrium temperature approaching the Curie temperature in response to the magnetic field. The method may additionally include conductively heating the workpiece in thermal contact with the susceptor face sheet and stabilizing the temperature of the susceptor face sheet at an equilibrium temperature below the Curie temperature. The method may additionally include adjusting at least one current parameter of the alternating current, and changing at least one heating characteristic of the susceptor face sheet in response to adjusting the current parameter of the alternating current.

The features, functions and advantages that have been discussed can be achieved independently in various embodiments of the present disclosure or may be combined in yet other embodiments, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 7 is a schematic sectional illustration of a susceptor face sheet in a magnetic state and illustrating the concentration of inductive current flow adjacent the surfaces of the susceptor face sheet;

FIG. 8 is a legend illustrating relative current density corresponding to the current density of the susceptor face sheet in the magnetic state of FIG. 7;

FIG. 9 is a graph of current density versus susceptor thickness for the susceptor face sheet in the magnetic state shown in FIG. 7 and illustrating a relatively high magnitude of the current density and the concentration thereof adjacent the surfaces of the susceptor face sheet and the exponential decrease of the current density moving inwardly away from the surfaces of the susceptor face sheet;

FIG. 10 is a schematic sectional illustration of a susceptor face sheet in a non-magnetic state and illustrating the substantially uniform decrease in current density moving inwardly away from the surfaces of the susceptor face sheet;

FIG. 11 is a legend illustrating relative current density corresponding to the current density of the susceptor face sheet in the non-magnetic state of FIG. 10;

FIG. 12 is a graph of current density versus susceptor thickness for the susceptor face sheet in the magnetic state of FIG. 10 and illustrating the reduced magnitude of the current density and substantially uniform decrease in the current density moving inwardly away from the surfaces of the susceptor face sheet;

DETAILED DESCRIPTION

Figure 1:
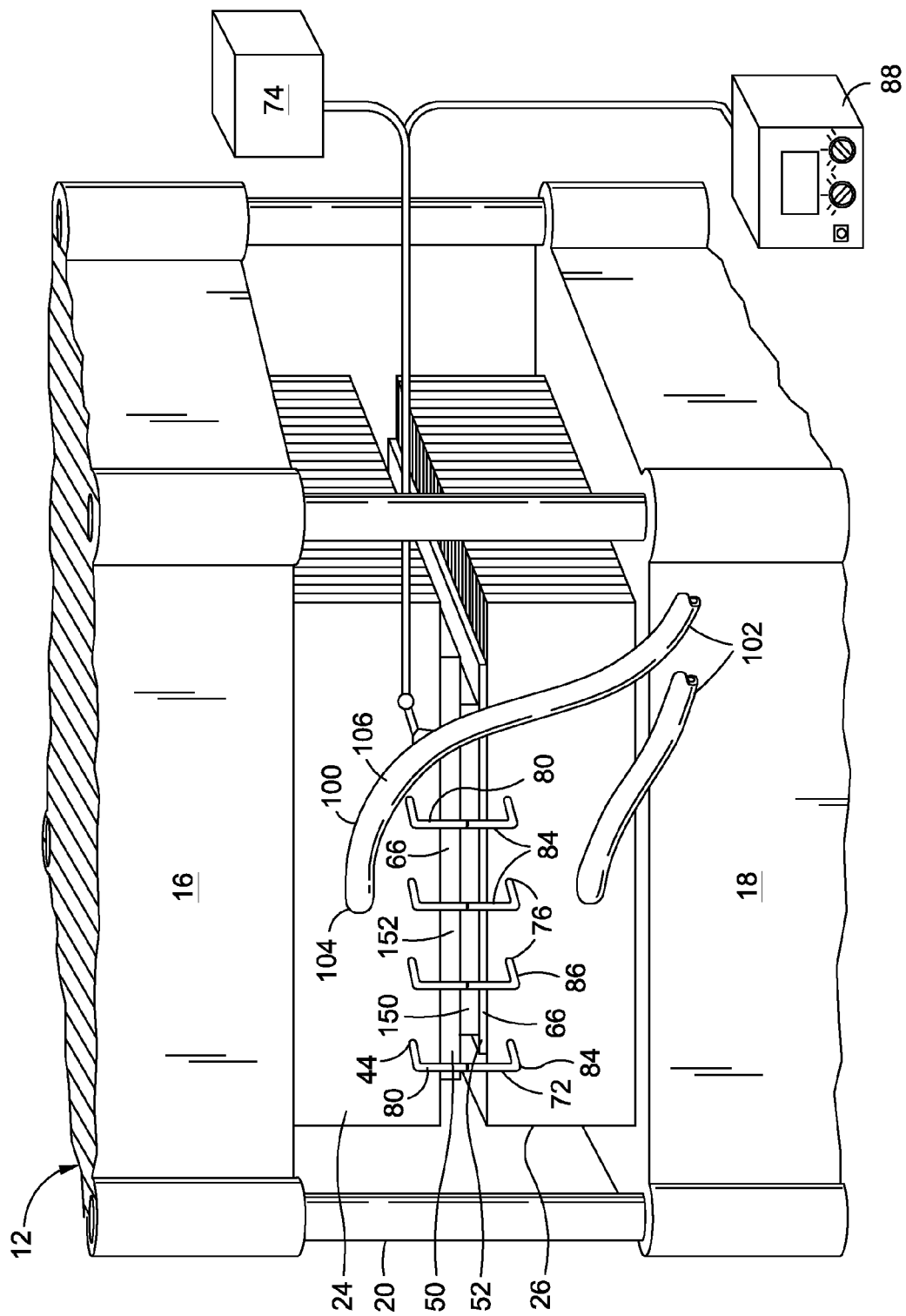
FIG. 1 is a perspective illustration of an embodiment of a press for applying compressive force to a workpiece during induction heating of the workpiece.

Referring now to the drawings wherein the showings are for purposes of illustrating preferred and various embodiments of the disclosure only, shown in FIG. 1 is an illustration of an embodiment of a press 12 that may be used for applying compressive force 14 to a workpiece 150 (FIG. 3) during inductive heating of the workpiece 150. The press 12 may be implemented for use in forming the workpiece 150 into an article 154 (FIG. 4). The heating of the workpiece 150 may be performed using one or more susceptor face sheets such as upper and lower susceptor face sheets 50, 52 that may be operatively coupled to the press 12. For example, the upper and/or lower susceptor face sheets 50, 52 may be mounted to respective upper and lower dies 24, 26 of the press 12.

The upper and/or lower susceptor face sheets 50, 52 may be formed of an electrically-conductive ferromagnetic alloy 66 material having a Curie temperature that is dependent upon the composition of the ferromagnetic alloy 66. In this regard, the ferromagnetic alloy 66 from which the upper and/or lower susceptor face sheets 50, 52 are formed may be selected based on the desired temperature to which the workpiece 150 may be heated. For example, the ferromagnetic alloy 66 composition may be selected having a Curie temperature that results in an equilibrium temperature in the upper and/or lower susceptor face sheets 50, 52 that approximately matches or corresponds to a desired temperature of the workpiece 150 such as a processing temperature of the workpiece 150. The processing temperature may comprise a melting temperature or a glass-transition temperature of the resin 158 (FIG. 4) in a thermoplastic preform 156. However, the desired temperature may also comprise a curing temperature for curing a given matrix material of a thermosetting workpiece 150. The desired temperature may also comprise a desired heat treating temperature for heat treating a metallic workpiece 150, or other temperatures associated with processing a workpiece.

In FIG. 1, the upper and/or lower susceptor face sheets 50, 52 may form part of an induction heating system 72. The upper and/or lower susceptor face sheets 50, 52 may be inductively heated to an equilibrium temperature in response to the flow of alternating current 86 (FIG. 4) through one or more induction coils 76. The induction coils 76 may be mounted adjacent to the upper and lower dies 24, 26. The one or more induction coils 76 may generate a magnetic field 90 (FIG. 5) in response to the flow of alternating current 86 through the induction coils 76. The magnetic field 90 may magnetically couple with the upper and/or lower susceptor face sheets 50, 52 and cause the inductive heating of the susceptor face sheets 50, 52 up to the equilibrium temperature which may approach the Curie temperature. In this regard, as the temperature of the susceptor face sheets 50, 52 approaches the Curie temperature, the magnetic properties of the ferromagnetic alloy 66 may start to decay which may result in a reduction in the inductive heating of the susceptor face sheets 50, 52. Portions of the susceptor face sheets 50, 52 that have attained the equilibrium temperature may become non-magnetic such that the flow of inductive current 94 in such portions of the susceptor face sheets 50, 52 automatically diminish to a level sufficient to stabilize or maintain the equilibrium temperature of the susceptor face sheets 50, 52. In this manner, the workpiece 150 may be substantially uniformly heated.

Advantageously, the system 10 and method disclosed herein may also include a means for adjusting the frequency of the alternating current 86 (FIG. 4) as a means to fine tune, change, adjust, or shift the equilibrium temperature and/or the heating rate of the upper and/or lower susceptor face sheets 50, 52. In addition, the system 10 and method may provide a means for adjusting the amplitude or amperage (A) of the alternating current 86 as a means to fine tune, change, adjust, or shift the equilibrium temperature or the heating rate of the upper and/or lower susceptor face sheets 50, 52. For example, the system 10 may provide a means to increase the frequency and/or the amperage of the alternating current 86 to cause an increase in the equilibrium temperature of the upper and/or lower susceptor face sheets 50, 52. In this manner, the temperature of the susceptor face sheet may be adjusted within a certain temperature range to more closely match the desired temperature of the workpiece 150.

Advantageously, by controlling the frequency and/or the amperage of the alternating current, the equilibrium temperature and the heating rate of the susceptor face sheets may be substantially matched to the desired temperature and heating rate of the workpiece without the need to formulate a new ferromagnetic alloy 66 composition and without the need to procure a different ferromagnetic alloy 66 having a slightly higher Curie temperature. In this regard, the system 10 and method disclosed herein provides a means to adjust the equilibrium temperature and the heating rate of the susceptor face sheets and avoid the time and expense associated with creating new ferromagnetic alloy 66s such as via powder metallurgy or searching for difficult to find ferromagnetic alloy 66s. In this manner, the system 10 disclosed herein provides a cost-effective and time-efficient manner in which to fine tune or substantially attain a desired temperature of the workpiece 150 using available ferromagnetic alloy 66s for the susceptor face sheets. For example, commercially-available ferromagnetic alloy 66s may be used to form the susceptor face sheets wherein the ferromagnetic alloy 66 results in an equilibrium temperature that approximately matches a desired temperate for heating, molding, forming, compressing, consolidating, curing, shaping, or otherwise processing of a workpiece 150. The system 10 disclosed herein may provide a means for fine-tuning or more closely matching the desired temperature or processing temperature of a composite workpiece 150 or fine-tune the temperature for a given thermal treatment processes of a metallic workpiece 150 such as an annealing processes.

Referring to FIG. 1, shown is an embodiment of the press 12 which may include upper and lower tools 16, 18. The upper and lower dies 24, 26 may be mounted to respective ones of the upper and lower tools 16, 18. The upper tool 16 and/or the lower tool 18 may be mounted to one or more posts 20 for slidably movement of the upper an/or lower dies toward and away from one another between closed and open positions 30, 28. amperage workpiece 150 may be positioned between the upper and lower susceptor face sheets 50, 52 in the open position after which the upper and/or lower dies 24, 26 may be moved toward one another to clamp the workpiece 150 between the upper and lower susceptor face sheets 50, 52 such as for consolidating a composite workpiece 150.

The induction coils 76 and the susceptor face sheets may form part of an induction heating system 72 that may be included with the press 12. The induction heating system 72 may include a power source 74 for supplying alternating current 86 (FIG. 4) to the one or more induction coils 76 that may extend through cutouts or penetrations 44 that maybe formed in the laminations 34 of the upper and/or lower dies 24, 26. As indicated above and described in greater detail below, the flow of the alternating current 86 through the induction coils 76 may generate a magnetic field 90 (FIG. 5) around the upper and/or lower susceptor face sheets 50, 52. The magnetic filed may cause inductive heating of the susceptor face sheets up to an equilibrium temperature. Advantageously, the induction heating system 72 may include a current controller 88 that may be coupled to the induction coils 76 for controlling one or more current parameters of the alternating current 86. For example, the current controller 88 may be configured to adjust the frequency of the alternating current 86 to cause a change in at least one heating parameter of the susceptor face sheet. In an embodiment mentioned above, the current controller 88 may be configured to adjust the frequency of the alternating current 86 to cause a shift in the equilibrium temperature of the susceptor face sheet. The current controller 88 may also be configured to adjust the frequency of the alternating current 86 to change the heating rate of the susceptor face sheet which, in turn, may cause a change in the heating rate of the workpiece 150. The current controller 88 may also be configured to adjust the amperage of the alternating current 86 to cause a shift in the equilibrium temperature of the susceptor face sheets or a change in the heating rate of the susceptor face sheets, as described in greater detail below.

In FIG. 1, the induction heating system 72 may include a cooling system 100 for actively cooling the susceptor face sheets. However, the cooling system 100 may optionally be configured to cool the susceptor face sheets by passive means (not shown). In an embodiment, the cooling system 100 may include a coolant source from which a coolant may routed to the upper and lower dies 24, 26 by means of one or more coolant conduits 102. The coolant may be provided in liquid and/or gas form. Coolant lines 104 may be extended through the upper and/or lower dies 24, 26 such that the coolant such as cooling gas 106 may be directed toward a backside surface 56, 60 of the susceptor face sheets for cooling the susceptor face sheets. In this manner, the temperature of the workpiece 150 may be reduced in a relatively rapid and controlled manner and held at a reduced temperature for a desired period of time which may facilitate the optimization of mechanical or physical properties in the workpiece 150.

Figure 2:
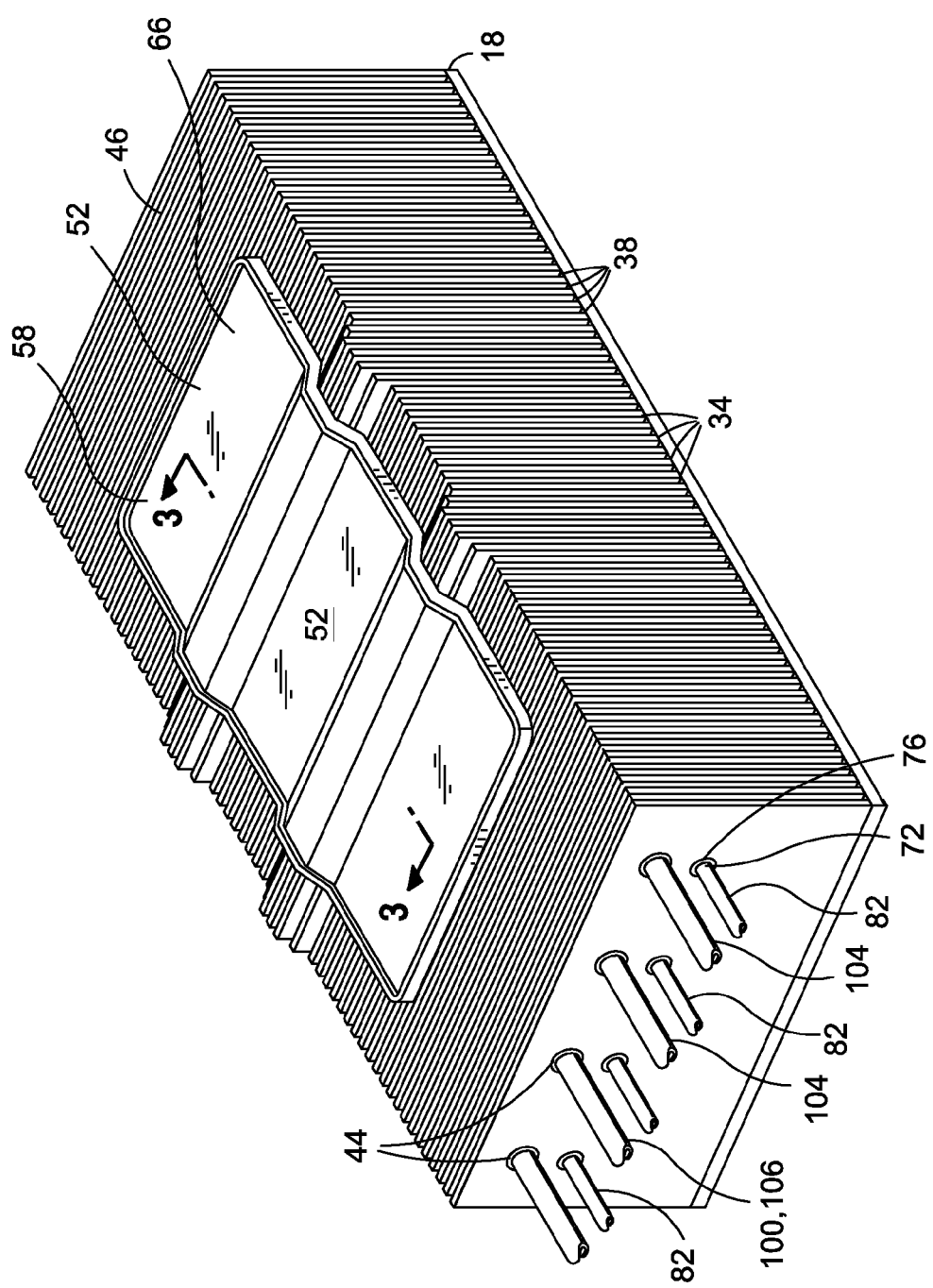
FIG. 2 is a perspective illustration of an embodiment of a lower die mounted in the press and having a susceptor face sheet supported by the lower die and being configured to receive the workpiece for inductive heating thereof.

Referring to FIG. 2, shown is an embodiment of a lower die 26 for supporting the lower susceptor face sheet. The lower die 26 and the lower susceptor face sheet 52 described herein may be configured substantially similar to the upper die 24 and upper susceptor face sheet 50 shown in FIG. 1 such that the following description of the lower die 26 and lower susceptor face sheet 52 may be applicable to the upper die 24 and upper susceptor face sheet. In the embodiment shown in FIG. 2, the lower die 26 may be comprised of a plurality of relatively thin, plates or laminations 34 arranged in spaced relation to one another to define a series of gaps or spacings 38 between the laminations 34. One or more lower coil portions 82 may extend through penetrations 44 formed in the laminations 34.

The laminations 34 may be oriented generally perpendicular to the one or more induction coils 76 and may be oriented along a direction generally parallel to a direction of a compressive force 14 (FIG. 4) that may be applied by the press 12. Due to the alignment of the laminations 34 with the orientation of the compressive force 14, the laminations 34 may effectively transfer the compressive force 14 into the susceptor face sheets 50, 52. Advantageously, the spacing 38 between the laminations 34 may minimize interference with electromagnetic energy emitted by the magnetic field 90 (FIG. 5) caused by the alternating current 86 (FIG. 4) passing through the induction coils 76 collectively defined by upper and lower coil portions 82 when electrically connected to one another. In this regard, the spacing 38 between the laminations 34 may result in the magnetic field 90 coupling primarily to the lower susceptor face sheet 52 with minimal coupling to the laminations 34.

The laminations 34 of the lower die 26 may define a die surface 46 that may include a contour that is shaped complementary to a final shape of an article 154 (FIG. 4) to be formed from a workpiece 150 to be heated by the lower susceptor face sheet. The lower susceptor face sheet 52 may have a backside surface 60 opposite the mold surface 54. The laminations 34 of the lower die 26 may be shaped complementary to the back side surface of the lower susceptor face sheet. The laminations 34 may be attached to the lower susceptor face sheet 52 by any means such as by tack-welding. The laminations 34 may be formed of relatively thin (e.g., 0.100 to 0.50 inch thick) material which may be a generally non-magnetic material such as austenitic stainless steel provided in any one of a variety of different alloys. The laminations 34 may also be formed of ceramic material or other material that is generally non-magnetic. The laminations 34 may also be formed of material that has a relatively low level of thermal conductivity to minimize thermal inertia effects of the laminations 34 on the lower susceptor face sheet. However, the laminations 34 may be formed of any material, without limitation, including magnetic material or non-magnetic material and including material having a relatively low level of thermal conductivity or a relatively high level of thermal conductivity.

In FIG. 2, the plurality of lower coil portions 82 extending through the lower die 26 may be matched in quantity by a correspond plurality of upper coil portions 78 (FIG. 1) extending through the upper die 24 (FIG. 1). The lower coil portions 82 may be electrically connected to the upper coil portions 78 (FIG. 3) when the upper and lower dies 24, 26 are in the closed position 30 (FIG. 4) and the electrical circuit of the one or more induction coils 76 is completed. In an embodiment, the connection of the upper and lower coil portions 78, 82 may form a spirally-wound induction coil 76 wherein the end connector 84 on one end of one of the lower coil portions 78, 82 is electrically connected to an upper coil portion 78 that is different than the upper coil portion 78 to which the end connector 84 on an opposite end of the lower coil portion 82 is connected. When the system 10 is viewed from the end as shown in FIG. 4, the spiral configuration of the interconnected upper and lower coil portions 78, 82 may have a rectangular shape. However, the spiral configuration of the induction coil 76 may have a shape other than a rectangular shape depending on the shape or configuration of the upper and lower coil portions 78, 82. The induction coils 76 may be configured to conduct the alternating current 86 (FIG. 4) therethrough and generate the magnetic field 90 (FIG. 5) in response to the alternating current 86. The arrangement of the one or more induction coils 76 formed by the interconnection of the upper and lower coil portions 78, 82 may result in substantially uniform inductive heating across the length and width of the upper and lower susceptor face sheet 50, 52.

FIG. 2 illustrates an embodiment of the active cooling system 100 including a plurality of coolant lines 104 positioned above the one or more induction coils 76. As mentioned above, the coolant lines 104 may carry a cooling medium for cooling the upper and/or lower susceptor face sheets 50, 52 (FIG. 1). In an embodiment, the coolant lines 104 may carry a gas 106 for forced-air cooling of the upper and/or lower susceptor face sheets 50, 52. For example, the cooling gas 106 may be directed against the backside surface 60 of the lower susceptor face sheet 52 for reducing the temperature of the lower susceptor face sheet 52. The upper susceptor face sheet 50 may be actively cooled in the same manner as the lower susceptor face sheet 52. In an embodiment, the coolant lines 104 may be formed of a generally non-magnetic material such as a polymeric material such as polyetheretherketone (PEEK). However, the coolant lines 104 may be formed of any one of a variety of different material including magnetic materials.

Figure 3:
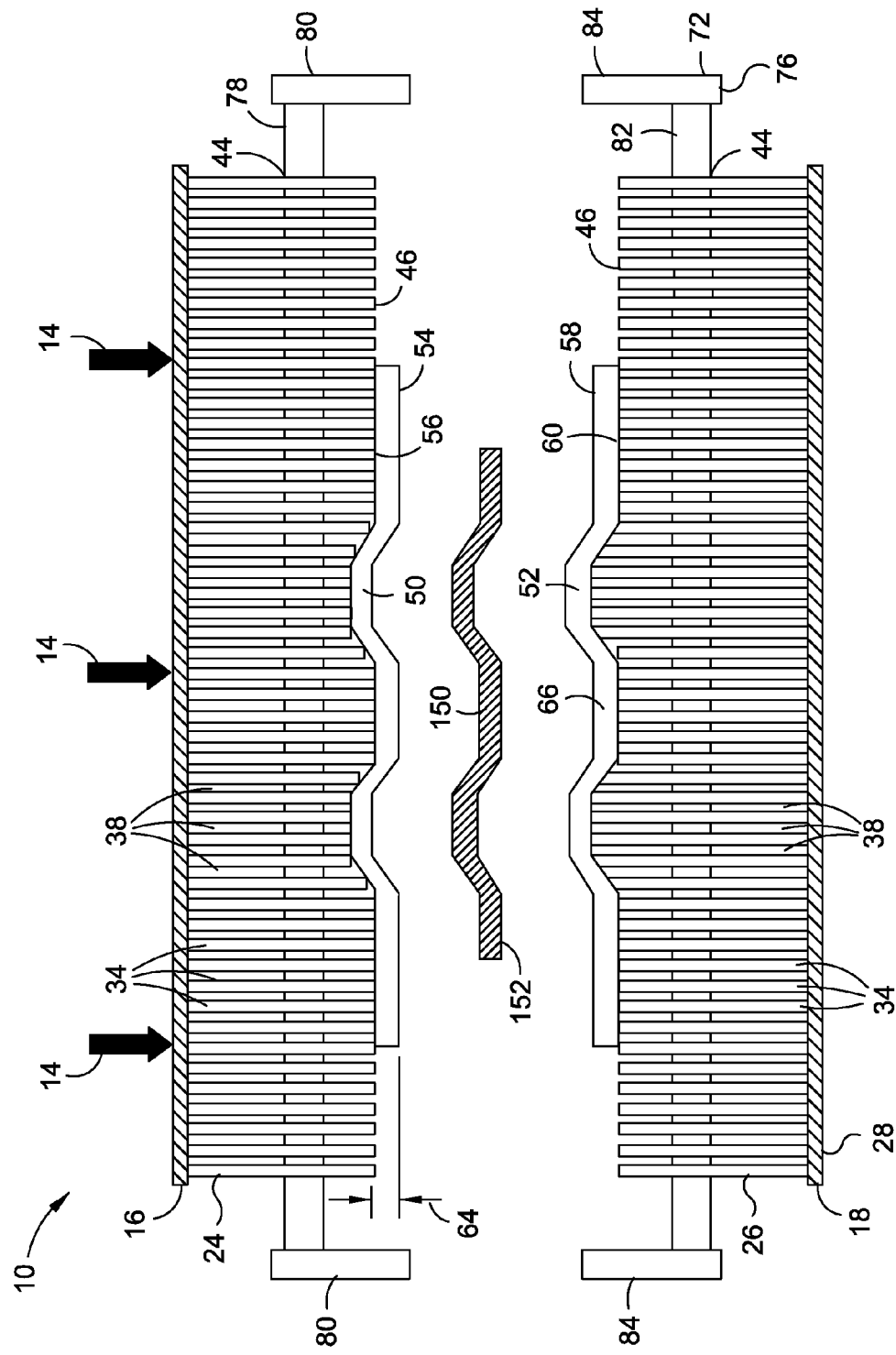
FIG. 3 is a side view schematic illustration of an embodiment of upper and lower dies in an open position and having corresponding upper and lower susceptor face sheets mounted thereto and further illustrating upper and lower coil portions for inductively heating the upper and lower susceptor face sheets in an embodiment.
Figure 4:
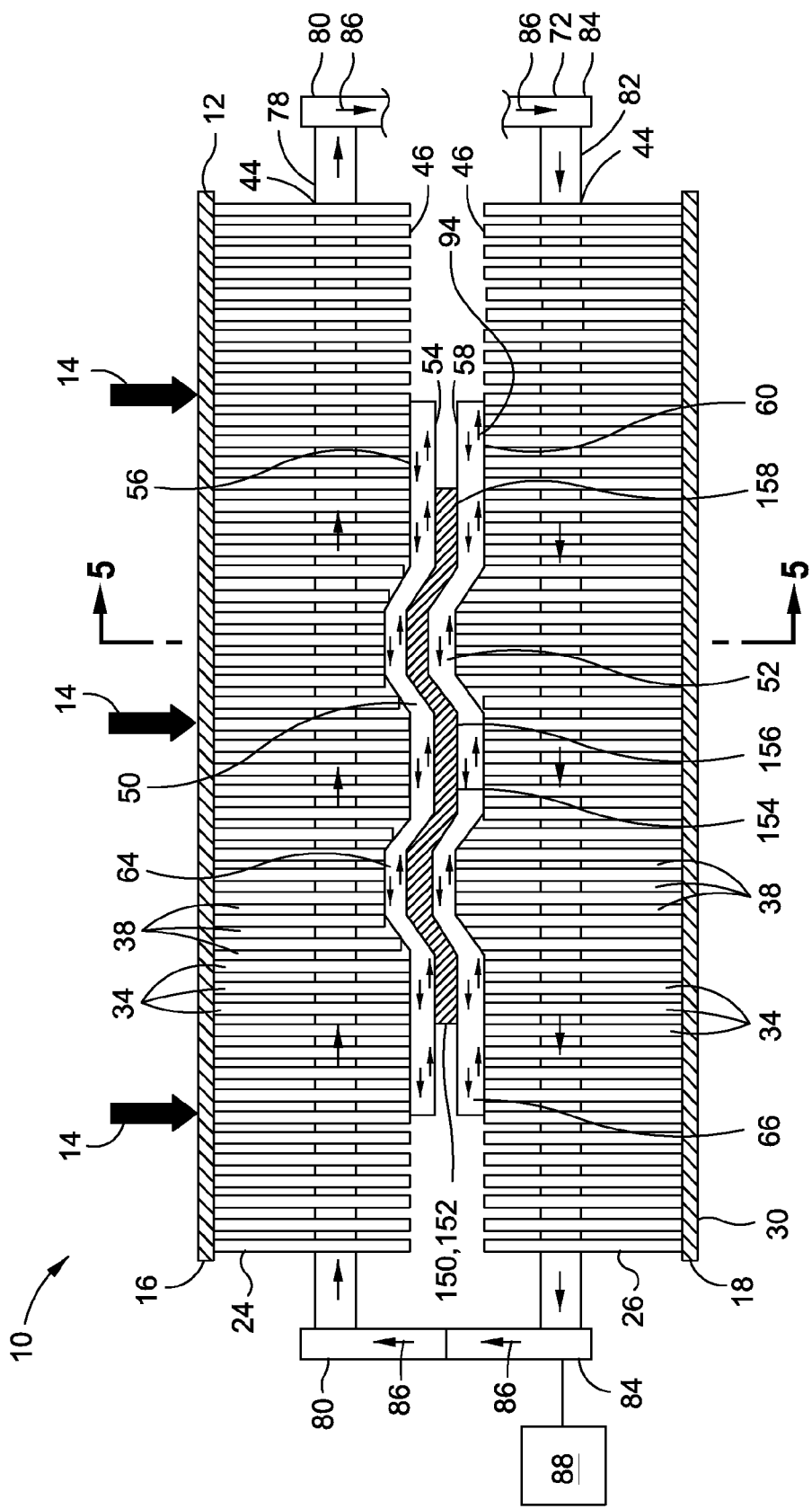
FIG. 4 is a side view schematic illustration of the upper and lower dies in a closed position having a workpiece clamped between the susceptor face sheets and illustrating an embodiment of the interconnection of the upper and lower coil portions and electrical current flow in the induction coil causing inductive current flow in the susceptor face sheets.

Referring to FIG. 3, shown are the upper and lower dies 24, 26 in an open position 28 with the workpiece 150 positioned between the upper and lower susceptor face sheets 50, 52 prior to drawing the upper and lower dies 24, 26 together to clamp the workpiece 150 therebetween. The workpiece 150 may be provided in a variety of shapes, sizes, configurations, and materials. For example, the workpiece 150 may be provided as a preform 152 for a composite article (not shown) such as a thermoplastic preform 156 to be heated and consolidated between the upper and lower susceptor face sheets 50, 52. The preform 152 may be provided in a shape that approximates the final shape of the article 154 to be formed from the preform 152. The mold surfaces 54, 58 of the upper and lower susceptor face sheets 50, 52 may also be shaped or contoured complementary to the final shape of the article 154 from which the preform 152 is formed.

The upper and lower susceptor face sheets 50, 52 may be formed of a ferromagnetic alloy 66 having a Curie temperature corresponding to a desired temperature associated with the processing of a workpiece 150. For example, the ferromagnetic alloy 66 may be selected having a Curie temperature that approximates a processing temperature of a thermoplastic preform 156. In this regard, the upper and lower susceptor face sheets 50, 52 may be formed of a ferromagnetic alloy 66 having a Curie temperature that approximates a melt temperature or a glass transition temperature of the thermoplastic preform 156. However, as was indicated above, the system 10 disclosed herein may be implemented for forming workpieces comprised of any one of a variety of different materials including composite preforms formed of thermosetting materials and or metallic workpieces that may be heat treated using the system 10 and method disclosed herein.

The upper and lower susceptor face sheets 50, 52 may be provided in a relatively small thickness to enhance the inductive heating of the susceptor face sheets 50, 52 in response to the magnetic field 90 (FIG. 5) generated by the alternating current 86 (FIG. 4) flowing through the induction coils 76. For example, each one of the upper and lower susceptor face sheets 50, 52 may have a thickness in the range of approximately 0.050 to 0.25 inch. In an embodiment, the upper and lower susceptor face sheets 50, 52 may each be provided in a thickness of approximately 0.100 to 0.150 inch. However, the upper and lower susceptor face sheets 50, 52 may be formed in any thickness, without limitation. In an embodiment, the upper and lower susceptor face sheets 50, 52 may be formed by machining the contoured shape of the mold surfaces 54, 58 and/or backside surfaces 56, 60 from a block of ferromagnetic alloy 66 material or plate of a ferromagnetic alloy 66. However, the upper and lower susceptor face sheets 50, 52 may be formed of sheet metal that may be shaped by bending the sheet metal into the desired contours or by using any one of a variety of other automatic or manual forming processes.

Referring to FIG. 4, shown are the upper and lower dies 24, 26 in a closed position 30 with the workpiece 150 clamped therebetween. A compressive force 14 may be applied by the press 12 to shape or consolidate the workpiece 150. The moving of the upper and lower dies 24, 26 into the closed position 30 causes the end connectors 80, 84 of the upper and lower coil portions 82 to close the circuit of the induction coils. Alternating current 86 may be provided to the induction coils 76 by a power source 74 such that a current flow passes through the induction coils 76. The current flow of alternating current 86 through the induction coil 76 results in inductive current 94 (FIG. 4) flow in the upper and lower susceptor face sheets 50, 52 and generating a magnetic field 90 (FIG. 5) causing the inductive heating of the upper and lower susceptor face sheets 50, 52 and the conductive heating of the workpiece 150 due to thermal contact of the workpiece 150 with the upper and lower susceptor face sheets 50, 52.

Figure 5:
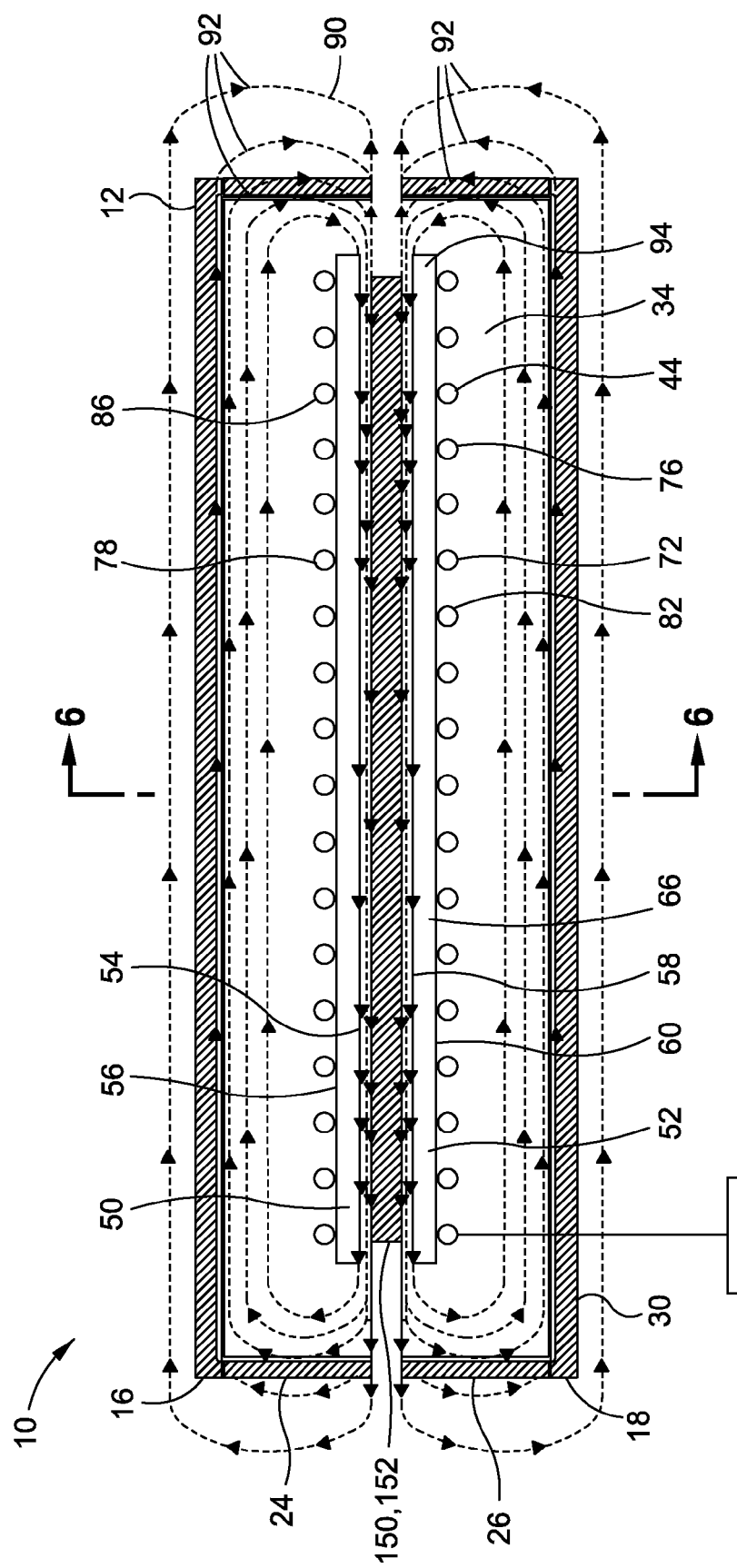
FIG. 5 is a sectional view of the upper and lower dies taken along line 5 of FIG. 4 and illustrating a magnetic field generated in response to the electrical current flow in the induction coil and wherein the flux lines of the magnetic field are oriented perpendicular to the direction of the electrical current flow in the induction coil.
Figure 6:
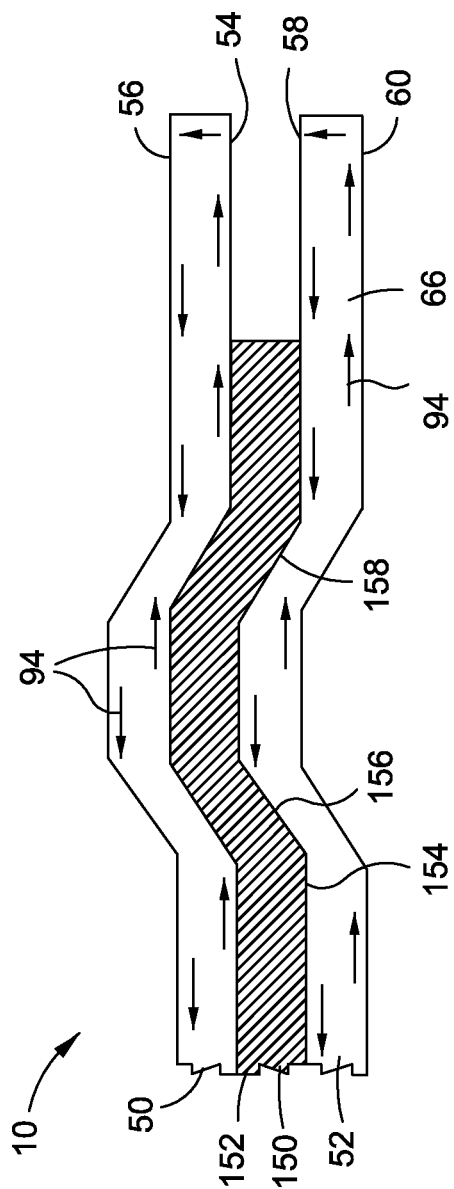
FIG. 6 is an enlarged cross-sectional view of a portion of the upper and lower susceptor face sheets taken along line 6 of FIG. 5 and illustrating the direction of inductive current flow in the susceptor face sheets.

Referring to FIG. 5, shown is a section view of the upper and lower dies 24, 26 and the upper and lower susceptor face sheets 50, 52 of FIG. 6 with the workpiece 150 clamped therebetween and illustrating the magnetic field 90 generated by the alternating current 86 flowing through the induction coils 76. The magnetic field 90 is illustrated by a plurality of flux lines 92 oriented generally perpendicularly relative to the direction of alternating current 86 flow through the induction coils 76 illustrated in FIG. 4. At temperatures below the Curie temperature, the magnetic field 90 may magnetically couple with the ferromagnetic alloy 66 of the upper and lower susceptor face sheets 50, 52. The arrangement of the relatively thin, spaced-apart laminations 34 that form the upper and lower dies 24, 26 may minimize interference with the magnetic field 90 generated by the alternating current 86 passing through the induction coils 76.

It should be noted that the arrangement of the one or more induction coils 76 illustrated in FIGS. 1 and 2-5 is not to be construed as limiting alternative arrangements for the induction coils 76. In this regard, FIGS. 1 and 4 illustrate an induction coil 76 formed by interconnecting the upper and lower coil portion to form a spirally-wound induction coil 76 wherein the end connector 84 on an end of one of the lower coil portions 78, 82 is electrically connected to an upper coil portion 78 that is different than the upper coil portion 78 to which the end connector 84 on an opposite end of the lower coil portion 82 is connected as described above. Such a spiral arrangement of the induction coil 76 advantageously result in the formation of the magnetic field 90 (FIG. 5) having flux lines 92 (FIG. 5) oriented generally similar to that which is illustrated in FIG. 5. In addition, such an arrangement of the induction coil 76 further advantageously results in the concentration of the inductive current 94 (FIG. 5) density along the outer surfaces of the susceptor face sheets 50, 52 (FIG. 6) such as along the mold surfaces 54, 58 (FIG. 6) and the backside surfaces 56, 60 (FIG. 6) when the ferromagnetic alloy 66 (FIG. 6) of the susceptor face sheets 50, 52 is in a magnetic state (FIG. 9).

However, the system 10 disclosed herein may include any one of a variety of alternative arrangements of induction coils 76 and is not limited to a spirally-wound induction coil 76 as shown in FIGS. 1 and 4 and described above. In any one of a variety of embodiments (not shown), one or more induction coils 76 may be arranged to maximize magnetic coupling with the ferromagnetic alloy 66 (FIG. 5) of the susceptor face sheets 50, 52 (FIG. 5) and result in a magnetic field 90 (FIG. 5) that causes the inductive current 94 (FIG. 6) density to be concentrated adjacent to the outer surfaces of the susceptor face sheets 50, 52 when the susceptor face sheets 50, 52 are in the magnetic state (FIG. 9). Further in this regard, the ferromagnetic alloy 66 of the susceptor face sheets 50, 52 may be selected to maximize current cancellation of the inductive current 94 flow within the susceptor face sheets 50, 52 during decay of the magnetic properties of the ferromagnetic alloy 66 when the temperature of the susceptor face sheets 50, 52 approaches the Curie temperature. The ferromagnetic alloy 66 may also be selected to provide maximum magnetic coupling with the magnetic field 90 and maximum current density (FIG. 9) for a given frequency or frequency range of the alternating current 86.

Referring to FIG. 6, shown is a partial section view of a portion of the upper and lower susceptor face sheets 50, 52 and showing the workpiece 150 clamped therebetween. Inductive current 94 (FIG. 4) flow can be seen circulating within each one of the upper and lower susceptor face sheets 50, 52 in response to the magnetic field 90 (FIG. 5) generated by the flow of alternating current 86 (FIG. 4) through the induction coil 76 (FIG. 4). The workpiece 150 (e.g., a preform 152) is in thermal contact with the mold surfaces 54, 58 of the upper and lower susceptor face sheets 50, 52. The heating of the upper and lower susceptor face sheets 50, 52 as a result of the flow of alternating current 86 through the induction coil 76 causes conductive heating of the workpiece 150. The flow of inductive current 94 in the susceptor face sheets 50, 52 may be generally concentrated adjacent to the outer surfaces of the susceptor face sheets 50, 52 such as along the mold surfaces 54, 58 and the backside surfaces 56, 60 when the ferromagnetic alloy 66 of the susceptor face sheets 50, 52 is in a magnetic state when the temperature is below the Curie temperature of the ferromagnetic alloy 66.

Referring to FIGS. 7-9, shown in FIG. 7 is a schematic illustration of a portion of a susceptor face sheet 200 wherein inductive current 94 (FIG. 4) flow was measured with the susceptor face sheet 200 in a magnetic state 206 at a temperature below the Curie temperature. FIG. 7 illustrates the concentration of inductive current 94 flow along the outer surfaces 204 of the susceptor face sheet 200. FIG. 8 is a legend indicating total current density 212 corresponding to different locations through the section of the susceptor face sheet 200 illustrated in FIG. 7. As can be seen in FIG. 7, the susceptor face sheet 200 has a relatively high current density 218 adjacent to the outer surfaces 204 and a relatively low current density 220 at the interior portions of the susceptor face sheet 200. FIG. 9 is a graph of total current density 212 versus susceptor thickness 214 for the susceptor face sheet 200 schematically illustrated in FIG. 7. FIG. 9 graphically illustrates the relatively high current density 218 concentrated at the outer surfaces 204 of the susceptor face sheet 200 and the exponential decay 210 in current density moving inwardly away from the outer surfaces 204 of the susceptor face sheet 200 in the magnetic state 206. In FIG. 9, the current density at the outer surfaces 204 is shown as being approximately $3.8 \times 10^7$ amps/meter$^2$.

Referring to FIGS. 10-12, shown is a schematic illustration of a portion of the same susceptor face sheet 200 shown in FIG. 7. However, the susceptor face sheet 200 in FIG. 10 is shown in a non-magnetic state 208 as may occur after a period of time when the susceptor face sheet 200 has undergone inductive heating and the temperature of the susceptor face sheet 200 approaches or nears the Curie temperature of the ferromagnetic alloy 66 from which the susceptor face sheet 200 is formed. Due to current cancellation (not shown) that occurs in a magnetic material nearing or at the Curie temperature, FIG. 10 illustrates the resulting low current density 220 along the outer surfaces 204 (e.g., mold line surface, backside surface) of the susceptor face sheet 200 relative to the high current density 218 concentration at the outer surfaces 204 of the susceptor face sheet 200 in the magnetic state shown in FIG. 9.

FIG. 11 is a legend indicating total current density 212 corresponding to different locations through the section of the susceptor face sheet 200 illustrated in FIG. 10. FIG. 12 is a graph of total current density 212 versus susceptor thickness 214 for the susceptor face sheet 200 schematically illustrated in FIG. 10. FIG. 12 graphically illustrates a reduced magnitude of current density of approximately $5.0 \times 10^6$ amps/meter$^2$ along the outer surfaces 204 of the susceptor face sheet 200 in the non-magnetic state 208 relative to the higher magnitude current density of approximately $3.8 \times 10^7$ amps/meter$^2$ for the susceptor face sheet 200 shown in the magnetic state shown in FIG. 9. In this regard, the current density for the susceptor face sheet 200 in the non-magnetic state 208 shown in FIG. 12 is almost an order of magnitude lower than the current density for the susceptor face sheet 200 in the magnetic state shown in FIG. 9. FIG. 12 also illustrates a substantially uniform or linear decrease in the current density moving inwardly away from the outer surfaces 204 of the susceptor face sheet 200 in contrast to the exponential decrease in current density for the susceptor face sheet 200 in the magnetic as shown in FIG. 9.

Figure 13:
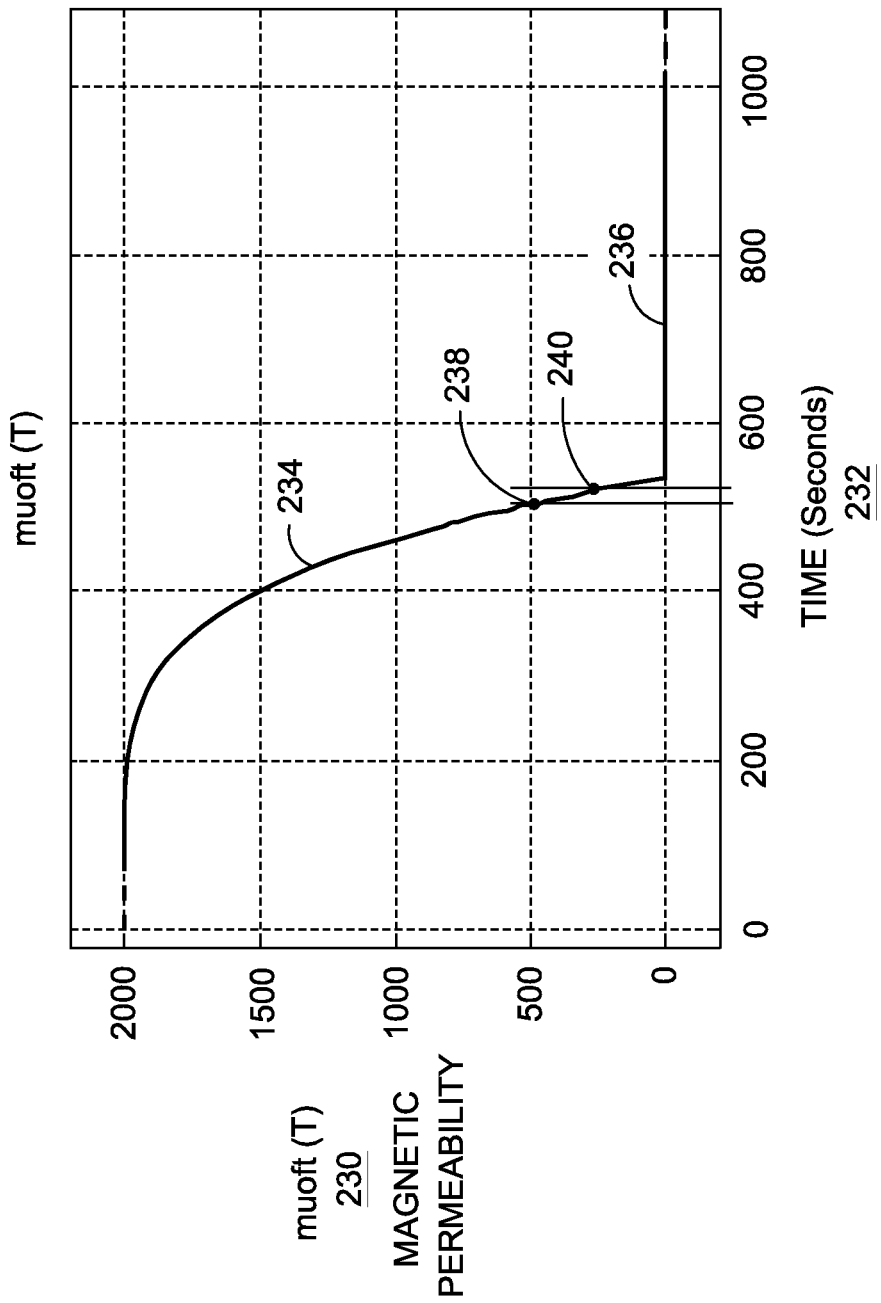
FIG. 13 is a plot of magnetic permeability versus temperature of a ferromagnetic alloy material and illustrating the exponential decay in the magnetic permeability as the temperature approaches the Curie temperature and further illustrating low and high equilibrium temperature points representing adjustment of a current parameter of the induction coil to vary the equilibrium temperature.

FIG. 13 is a plot of magnetic permeability 230 versus temperature 232 of a ferromagnetic alloy material and illustrating the exponential decay 234 of a curve representing the magnetic permeability 230 of a susceptor face sheet (not shown) formed of a ferromagnetic alloy as the temperature 232 thereof approaches the Curie temperature 236 of the ferromagnetic alloy. FIG. 13 further illustrates a low equilibrium temperature 238 point on the curve and a high equilibrium temperature 240 point on the curve. The low equilibrium temperature 238 point on the curve corresponds to a relatively high magnetic permeability of the susceptor face sheet corresponding to a lower frequency of the alternating current (not shown) flowing through an induction coil (not shown). The high equilibrium temperature 240 point on the curve corresponds to a relatively lower magnetic permeability of the susceptor face sheet, requiring a higher frequency of an alternating current flowing through the induction coil. As described in relation to the graph of FIG. 7, when the susceptor face sheet 200 is in a magnetic state, the current density is concentrated along the outer surfaces of the susceptor face sheet. As the frequency of the alternating current is increased, a greater portion of the current is concentrated along an outer surface of the susceptor face sheet which increases the amount of cross-sectional area that may be available in the susceptor face sheet for increasing the density of the inductive current flow. In this manner, for a given susceptor thickness, adjusting the alternating current to increase the frequency results in an increase in equilibrium temperature of a susceptor face sheet.

Advantageously, the system 10 disclosed herein provides a means for adjusting the frequency of the alternating current 86 (FIG. 4) such as by using a current controller 88 as illustrated in FIGS. 1 and 4. In an embodiment, the alternating current 86 may be supplied to one or more induction coils 76 (FIG. 4) in a frequency range of from approximately 1 kHz to 300 kHz. For example, the alternating current 86 may be provided in a frequency range of from approximately 2 kHz to 20 kHz. The amperage of the alternating current 86 may be provided to the induction coils 76 within a range of between approximately 10 amps and 10,000 amps although the alternating current 86 may be provided at amperages smaller than 10 amps or larger than 10,000 amps. The alternating current 86 may also be provided in a voltage of between approximately 10 volts and 300 volts although the alternating current 86 may be provided in voltages smaller than 10 volts or larger than 300 volts.

In an embodiment, the current controller 88 (FIG. 4) may be coupled to the induction coil 76 (FIG. 4) and may be configured to adjust the alternating current 86 (FIG. 4) in a manner causing a change in one or more heating parameters of the susceptor face sheet. For example, the current controller 88 may be configured to adjust the alternating current 86 to cause a change or shift in the equilibrium temperature of the susceptor face sheet 50, 52 (FIG. 4). The current controller 88 may be configured to adjust the frequency of the alternating current 86 provided to the induction coil 76 during initial heating of the susceptor face sheet, and/or, the current controller 88 may be configured to adjust the frequency of the alternating current 86 upon attainment of an initial equilibrium temperature in the susceptor face sheet to increase or decrease the equilibrium temperature of the susceptor face sheet.

In an embodiment, the current controller 88 (FIG. 4) may be configured to adjust the frequency of the alternating current 86 to effectuate a change or shift in the equilibrium temperature of between approximately 5 and 15 degrees Fahrenheit (F) from an initial equilibrium temperature although the current controller 88 may be configured to adjust the frequency of the alternating current 86 to cause shifts in the equilibrium temperature less than 5 degrees F. or greater than 15 degrees F. In an embodiment, the current controller 88 may adjust the frequency of the alternating current 86 to cause a shift in the equilibrium temperature of approximately plus or minus 7 degrees Fahrenheit from an initial equilibrium temperature of the susceptor face sheets 50, 52 (FIG. 4) although the current controller 88 may be configured to cause larger shifts (i.e., greater than plus or minus 7 degrees F.) in the equilibrium temperature of the susceptor face sheets 50, 52. The magnitude of the shift in the equilibrium temperature may be based upon the magnitude of the change in the frequency of the alternating current 86.

In an embodiment, an increase or decrease in the frequency of the alternating current 86 by up to a factor of 2 or greater may result in a corresponding increase or decrease in the equilibrium temperature of between approximately 5 and 15 degrees Fahrenheit. For example, an increase in the frequency of the alternating current 86 from approximately 10 kHz to 20 kHz may result in an increase in the equilibrium temperature of between approximately 5 and 15 degrees Fahrenheit. Likewise, a decrease in the frequency of the alternating current 86 from approximately 20 kHz to 10 kHz may result in a decrease in the equilibrium temperature of between approximately 5 and 15 degrees Fahrenheit. In another example, an increase in the frequency of the alternating current 86 from approximately 20 kHz to 40 kHz may result in an increase in the equilibrium temperature of between approximately 5 and 15 degrees Fahrenheit. In this regard, the magnitude of the increase or decrease in the frequency of the alternating current 86 to effectuate a desired increase or decrease in the equilibrium temperature of the susceptor face sheets 50, 52 is based on the frequency of the alternating current 86 at the initial equilibrium temperature. A relatively higher frequency of the alternating current 86 at a given equilibrium temperature may require a correspondingly larger increase or decrease in frequency to effectuate a given increase or decrease in the equilibrium temperature of the susceptor face sheets 50, 52.

The magnitude of the shift of the equilibrium temperature may also be dependent on the composition of the ferromagnetic alloy 66 from which the susceptor face sheets 50, 52 are formed. For example, certain compositions of the ferromagnetic alloy 66 (FIG. 4) may provide a relatively larger range of equilibrium temperatures for a given range of frequency changes in comparison to the range of equilibrium temperatures that may result from using a different ferromagnetic alloy 66 composition subjected the same range of frequency changes in the alternating current 86.

The current controller 88 (FIG. 1) may also be configured to adjust the amperage of the alternating current 86 (FIG. 4) to cause a change in one or more heating parameters of the susceptor face sheets 50, 52. For example, the current controller 88 may be configured to adjust the amperage to change or shift the equilibrium temperature of the susceptor face sheets 50, 52 such as to cause an increase or a decrease in the equilibrium temperature of the susceptor face sheets 50, 52. For example, the current controller 88 may be configured to adjust the amperage of the alternating current 86 by at least approximately 10 amps or greater and cause the shift in the equilibrium temperature of between approximately 5 to 15 degrees Fahrenheit although the current controller 88 may be configured to adjust the amperage to cause shifts in the equilibrium temperature less than 5 degrees F. or greater than 15 degrees F. The current controller 88 may also be configured to adjust the amperage of the alternating current 86 to change the heating rate of the susceptor face sheets 50, 52.

Figure 14:
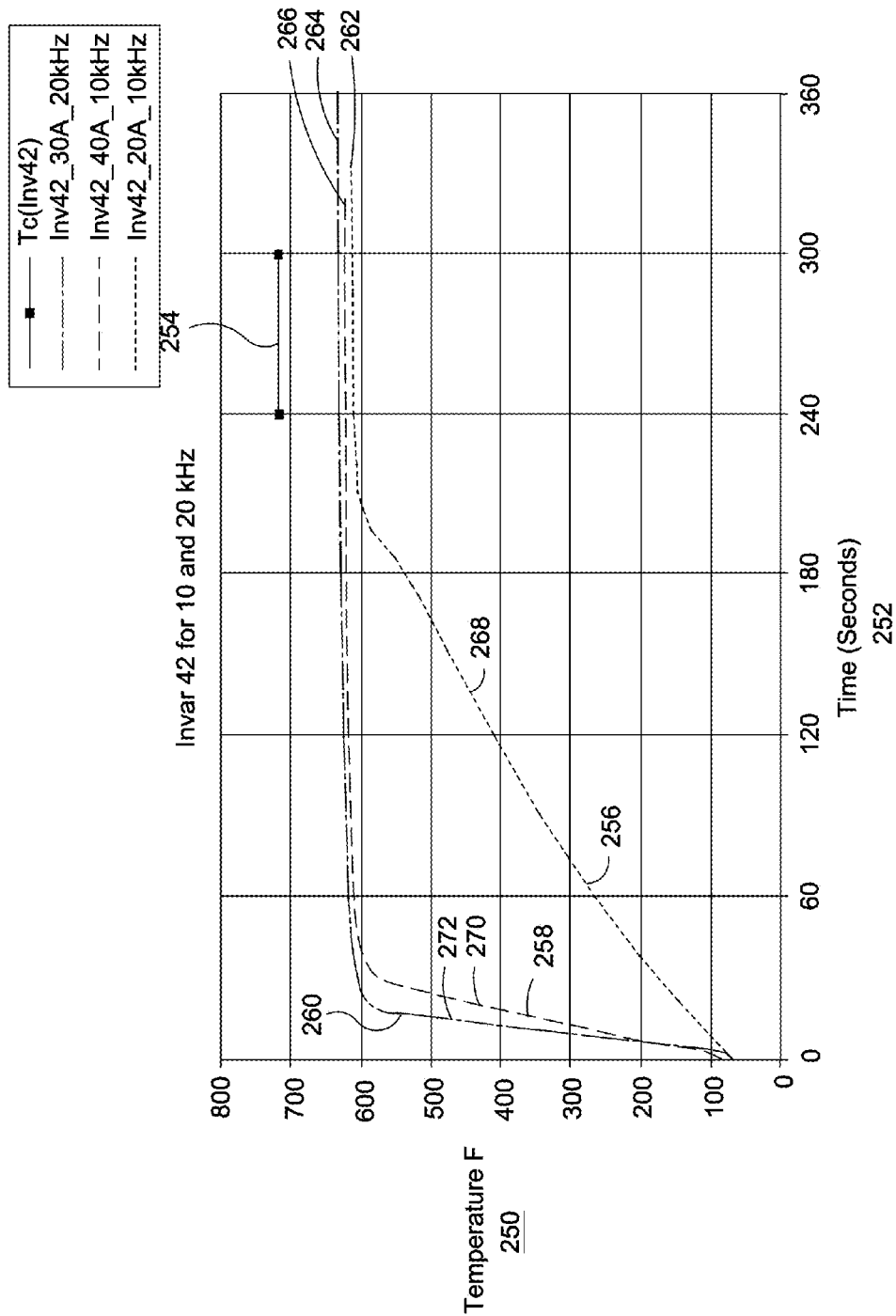
FIG. 14 is a plot of three different thermal profiles of a ferromagnetic material inductively heated by alternating current applied to an induction coil at different frequencies and/or amperages and illustrating the effect thereof on the equilibrium temperature and the heating rate of the ferromagnetic alloy.

Referring to FIG. 14, shown is a plot of three different thermal profiles 256, 258, 260 of the same nickel-steel ferromagnetic alloy (not shown) susceptor material inductively heated by an alternating current (not shown) applied to an induction coil (not shown) at different frequencies and/or different amperages. The first thermal profile 256 is a result of the application of an alternating current of 20 amps (A) at 10 kHz. The second thermal profile 258 is a result of the application of an alternating current of 40 amps at 10 kHz to the same nickel-steel ferromagnetic alloy 66 represented by the first thermal profile 256. As can be seen in FIG. 14, the increase in the amperage from 20 amps in the first thermal profile 256 to 40 amps in the second thermal profile 258 results in an increase from the relatively low first heating rate 268 of the first thermal profile 256 to a relatively higher second heating rate 270 of the second thermal profile 258. In addition, the increase in amperage of the alternating current from the first thermal profile 256 to the second thermal profile 258 results in an increase from the first equilibrium temperature 262 of the first thermal profile 256 to a higher second equilibrium temperature 264 of the second thermal profile 258.

FIG. 14 also illustrates the differences in the effect of change in frequency on equilibrium temperature relative to the effect of change in amperage on equilibrium temperature. For example, a higher third equilibrium temperature 266 in the third thermal profile 260 is a result of the application of a lower amperage of 30 amps at 20,000 Hz (20 kHz) frequency relative to a higher amperage of 40 amps at a lower 10 kHz frequency in the second thermal profile 258 indicating that, at least for the nickel-steel ferromagnetic alloy (not shown) composition represented in FIG. 14, frequency may be dominant (e.g. relative to amperage) in effecting change in the equilibrium temperature. As may be appreciated, the thermal profiles 256, 258, 260 illustrated in FIG. 14 are not to be construed as limiting alternative ranges for adjusting the frequency or amperage of alternating current (not shown) applied to a susceptor. In this regard, the system 10 disclosed here may be implemented with any ranges of frequency changes of the alternating current and any range of amperage changes of the alternating current.

Figure 15:
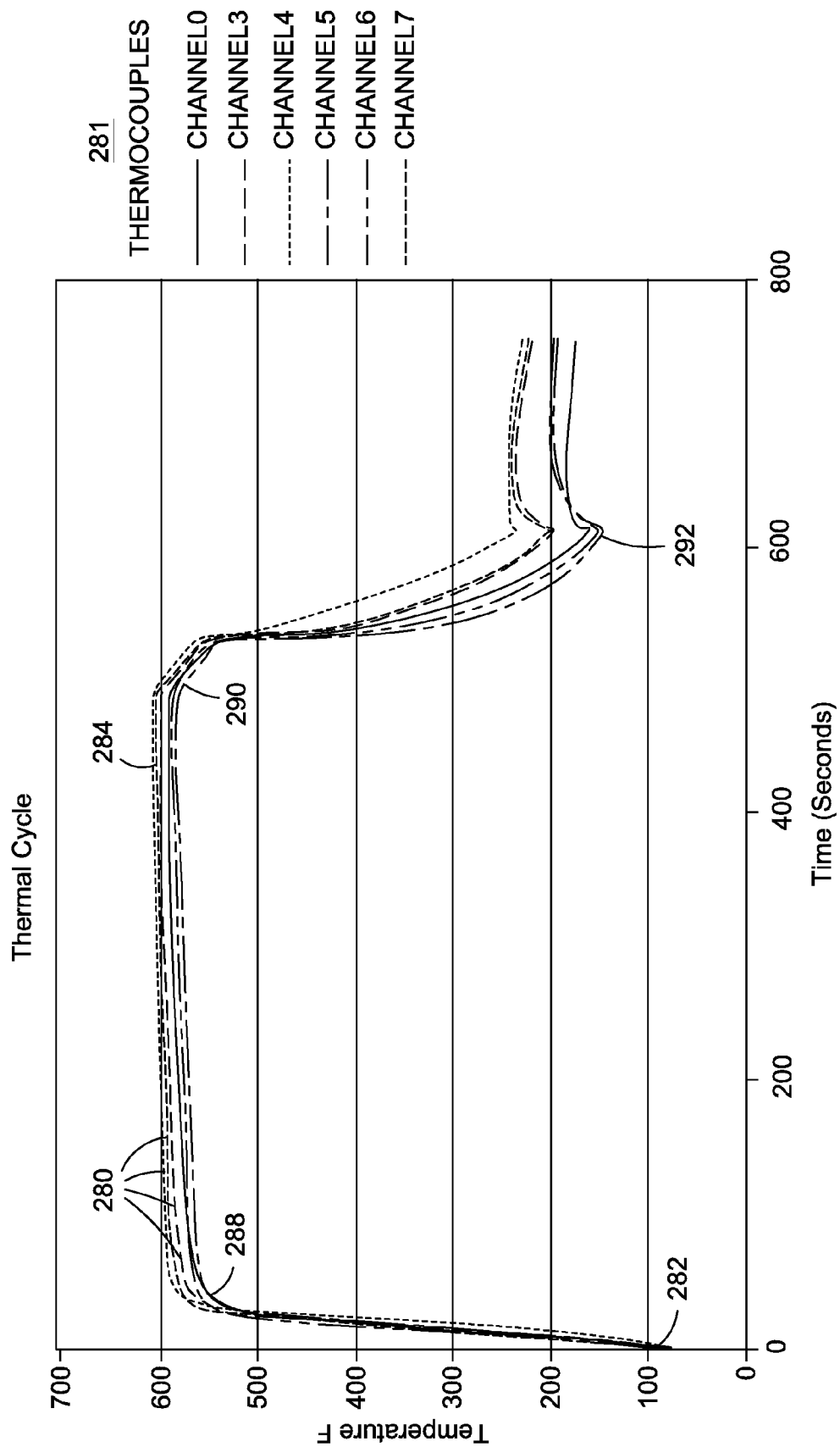
FIG. 15 is a plot of the thermal profiles of a plurality of different locations on a susceptor face sheet and illustrating temperature uniformity at the different locations due to inductive heating and further illustrating thermal cycling capability of the susceptor face sheet by active cooling.

Referring to FIG. 15 shown is a plot of substantially similar thermal profiles 280 of a plurality of thermocouples (not shown) mounted at different locations on a susceptor face sheet (not shown) to illustrate temperature uniformity at the different locations due to the use of a ferromagnetic alloy (not shown) and to illustrate thermal cycling using the system 10 (FIG. 1) disclosed herein. Advantageously, temperature uniformity across the length and width of a susceptor face sheet may be advantageously provided by the ferromagnetic alloy material wherein portions of the susceptor face sheet that have attained an equilibrium temperature may become non-magnetic such that the flow of inductive current in such portions of the susceptor face sheet automatically diminish to a level sufficient to stabilize the temperature of the portion at the equilibrium temperature. Portions of a susceptor face sheet that are below the equilibrium temperature remain in a magnetic state causing continued localized heating of such portions of the susceptor face sheet until such portions also attain the equilibrium temperature.

In FIG. 15, it can be seen that each one of the thermal profiles 280 increases from an initial temperature 282 at substantially the same heating rate and attains substantially the same first equilibrium temperature 284 within a first time period 288. FIG. 15 further illustrates the substantial maintenance of the first equilibrium temperature 284 during a second time period 290 after which the flow of alternating current (not shown) to the induction coils (not shown) may be stopped. Active cooling (not shown) may then be provided to the susceptor face sheet (not shown) to reduce the first equilibrium temperature 284 to a second equilibrium temperature 286 during a third time period 292. For example, a cooling system (not shown) may direct cooling gas (not shown) onto the susceptor face sheet (not shown) to reduce the temperature of the susceptor face sheet to the second equilibrium temperature 286 in a controlled manner using residual heat in the workpiece (not shown) and/or residual heat in the susceptor face sheet. In this manner, the active cooling system 100 may be used to control the rate at which the temperature of the workpiece and the susceptor face sheet are reduced. As indicated above, the ability to control the rate of heating and cooling of a workpiece such as a thermoplastic preform may facilitate the optimization of the mechanical and/or the physical properties of the final article.

Figure 16:
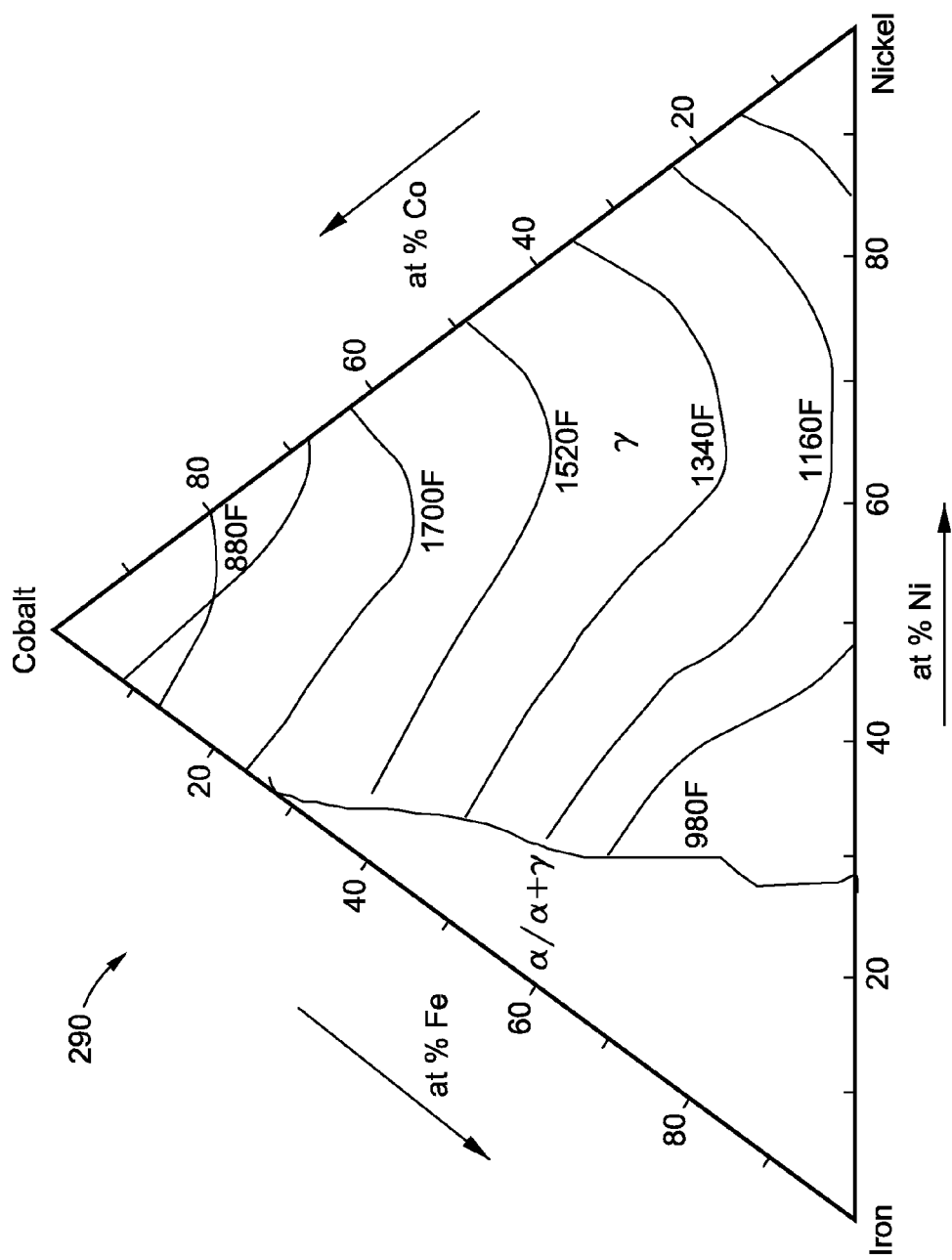
FIG. 16 is a diagram of several ferromagnetic alloys of a wide variety of ferromagnetic alloys from which the susceptor face sheets may be formed.

FIG. 16 is diagram 290 of the ferromagnetic alloy 66 elements iron, cobalt, and nickel and which may be selected in any one of a variety of different proportions relative to one another or relative to other alloys to achieve the desired heating characteristics of a susceptor face sheet (not shown). In this regard, different combinations of alloys may be selected to provide a desired equilibrium temperature in a susceptor face sheet or a desired range of equilibrium temperatures that may be attainable in a susceptor face sheet by adjusting one or more current parameters of an alternating current (not shown) flowing through an induction coil (not shown). As indicated above, such current parameters may include the frequency and the amperage of the alternating current flowing in the induction coil. The current parameters may be adjusted to effectuate changes in one or more heating parameters of the susceptor face sheet. For example, the current parameters may be adjusted to effectuate an increase or a decrease in the equilibrium temperature or an increase or a decrease in the heating rate of the susceptor face sheet. Furthermore, different combinations of alloys may be selected to provide larger or smaller ranges over which the equilibrium temperature may be shifted or larger or smaller ranges over which the heating rate may be adjusted by changing the frequency of the alternating current by a given amount or by change the amperage of the alternating current by a given amount.

Figure 17:
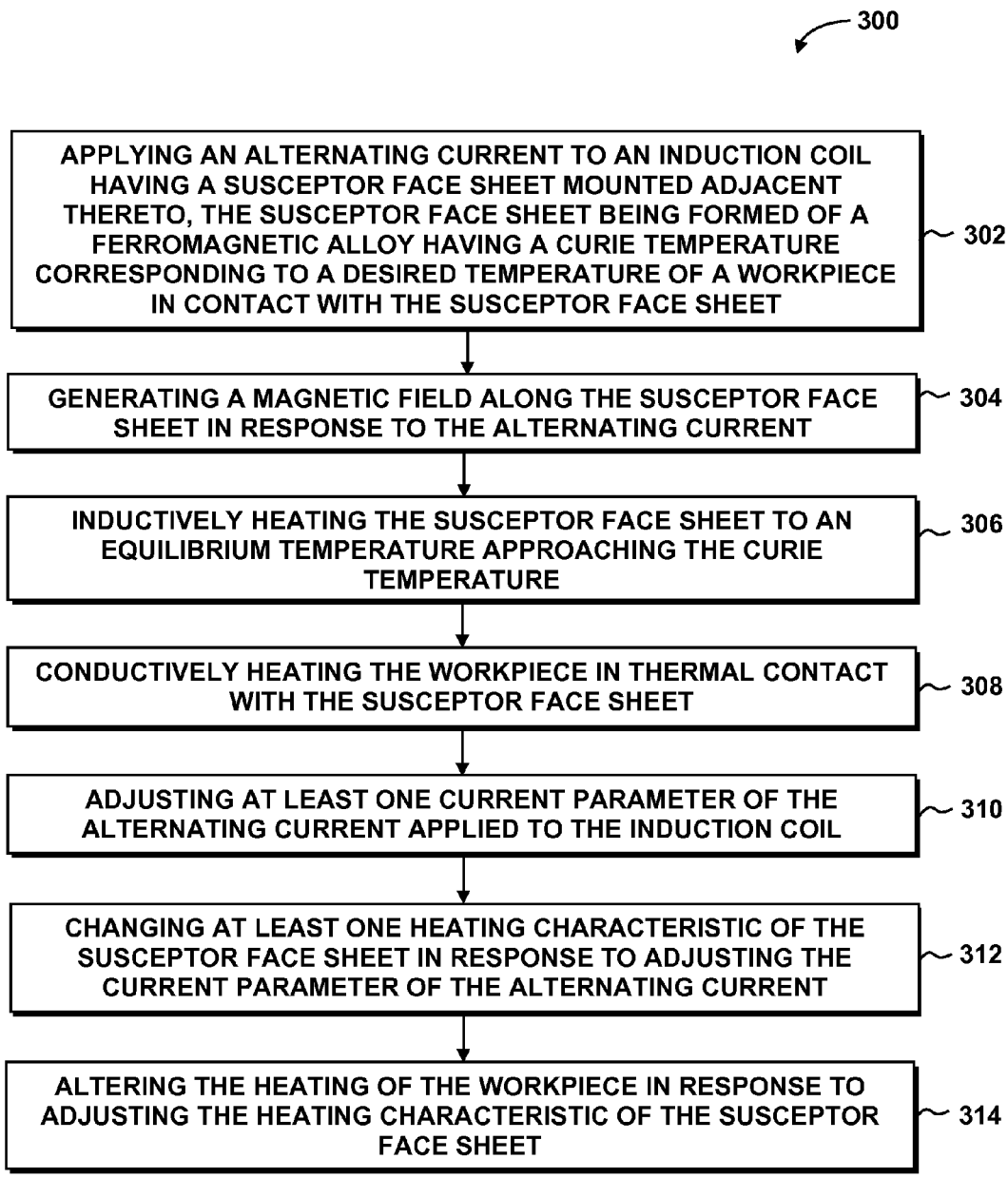
FIG. 17 is an illustration of a flow diagram of a method of inductively heating a workpiece and adjusting one or more heating parameters of the workpiece by altering one or more current parameters of the alternating current such as the frequency and/or amperage of the alternating current applied to the induction coil.

Referring to FIG. 17, shown is a flow diagram of a method 300 of inductively heating a workpiece 150 (FIG. 4). Advantageously, the method includes the adjustment of one or more heating parameters of a workpiece 150 by altering one or more current parameters of the alternating current 86 (FIG. 4). For example, the method may include the adjustment of the frequency and/or amperage of an alternating current applied to an induction coil 76 (FIG. 4) to cause a shift in the equilibrium temperature of a susceptor face sheet (FIG. 4) and/or to cause a change in the heating rate of the susceptor face sheet.

In Step 302 of the method 300 of FIG. 17, alternating current 86 (FIG. 4) may be applied to one or more induction coils 76 (FIG. 4). One or more susceptor face sheets 50, 52 (FIG. 4) may be mounted adjacent to the induction coils 76. The susceptor face sheets 50, 52 may be formed of a ferromagnetic alloy 66 (FIG. 4) having a Curie temperature. The Curie temperature may correspond to a desired temperature of a workpiece 150 (FIG. 4) in contact with the susceptor face sheets 50, 52. In an embodiment, the workpiece 150 may be sandwiched between at least two susceptor face sheets 50, 52 having mold surfaces 54, 58 that may be configured complementary to the final shape of an article formed from the workpiece 150.

Step 304 of the method 300 of FIG. 17 may comprise generating a magnetic field 90 (FIG. 5) along the susceptor face sheets 50, 52 (FIG. 4) in response to the application of the alternating current 86 (FIG. 4) to the induction coils 76. For example, FIG. 4 illustrates the application of current 86 flow through the induction coil 76 (FIG. 4) formed by the electrical connection of the upper and lower coil portions 78, 82 (FIG. 4) when the upper and lower dies 24, 26 (FIG. 4) are in the closed position 30 (FIG. 4).

Step 306 of the method 300 of FIG. 17 may comprise inductively heating the susceptor face sheets 50, 52 (FIG. 4) to an equilibrium temperature approaching the Curie temperature. The susceptor face sheets 50, 52 may be heated in response to the magnetic field 90 (FIG. 5) generated as shown in FIG. 5. The susceptor face sheets 50, 52 may be magnetically coupled to the magnetic field 90 resulting in inductive heating of the susceptor face sheets 50, 52.

Step 308 of the method 300 of FIG. 17 may comprise conductively heating the workpiece 150 (FIG. 4) that may be in thermal contact with the susceptor face sheets 50, 52 (FIG. 4). The thermal contact of the workpiece 150 with the susceptor face sheets 50, 52 may cause an increase in the workpiece 150 temperature due to conductive heat transfer from the susceptor face sheets 50, 52 to the workpiece 150. The temperature of the susceptor face sheets 50, 52 (FIG. 4) may stabilize at an equilibrium temperature below the Curie temperature. In this regard, the inductive heating of the susceptor face sheets 50, 52 may decrease as the temperature of the susceptor face sheets 50, 52 approaches the Curie temperature and the magnetic properties (e.g., permeability) of the ferromagnetic alloy 66 (FIG. 4) start to decay. The decay of the magnetic properties may result in a reduction in the inductive heating of the susceptor face sheets 50, 52. The temperature of the susceptor face sheets 50, 52 may stabilize as the flow of inductive current 94 (FIG. 4) in the susceptor face sheets 50, 52 automatically diminishes to a level sufficient to maintain the temperature of the susceptor face sheets 50, 52 at the equilibrium temperature.

Step 310 of the method 300 of FIG. 17 may comprise adjusting at least one current parameter of the alternating current 86 (FIG. 4). For example, the current parameter may comprise the frequency of the alternating current 86 or the amperage of the alternating current 86. The frequency of the alternating current 86 may be increased or decreased within a predetermined range. The amperage may also be increased or decreased within a predetermined range.

Step 312 of the method 300 of FIG. 17 may comprise changing at least one heating characteristic of the susceptor face sheet in response to adjusting one or more current parameters of the alternating current 86 (FIG. 4). For example, the heating parameter may comprise the equilibrium temperature of the susceptor face sheet which may be shifted by changing or adjusting the frequency or the amperage of the alternating current 86. The heating parameter may also comprise the heating rate at which the susceptor face sheet is heated and which may be increased or decreased by respectively increasing or decreasing the amperage of the alternating current 86.

Step 314 of the method 300 of FIG. 17 may comprise altering the heating of the workpiece 150 (FIG. 4) in response to adjusting the heating characteristic of the susceptor face sheets 50, 52 (FIG. 4). For example, the workpiece 150 temperature may be increased by increasing the frequency and/or the amperage of the alternating current 86 (FIG. 4). The workpiece 150 heating rate may also be changed by changing the frequency or amperage of the alternating current 86 (FIG. 4). For example, the workpiece 150 heating rate may be increased by increasing the frequency and/or by increasing the amperage of the alternating current 86. Conversely, the workpiece 150 heating rate may be decreased by decreasing the frequency of the alternating current 86 and/or by decreasing the amperage of the alternating current 86.

The method of inductively heating the workpiece 150 (FIG. 4) may also include selecting a ferromagnetic alloy 66 (FIG. 4) from which the susceptor face sheets 50, 52 (FIG. 4) may be formed and which is compatible with the temperatures ranges over which the workpiece 150 (FIG. 4) may be heated. In this regard, the method may include selecting a ferromagnetic alloy 66 having a Curie temperature that corresponds to a desired processing temperature of the workpiece 150. The ferromagnetic alloy 66 may be selected having a Curie temperature such that the equilibrium temperature of the susceptor face sheets 50, 52 is within a predetermined range of the desired temperature of the workpiece 150.

For example, a ferromagnetic alloy 66 may be selected that provides a Curie temperature that results in an equilibrium temperature in the susceptor face sheets 50, 52 (FIG. 4) that is at equivalent to or above a melting temperature or a glass transition temperature of thermoplastic resin 158 (FIG. 4) in a thermoplastic preform 156 (FIG. 4). The alternating current 86 (FIG. 4) may also be selected to allow for fine tuning of the equilibrium temperature of the susceptor face sheets 50, 52 by adjusting the frequency or amperage of the alternating current 86 such that the temperature of the preform 152 may be increased or decreased as necessary to attain a desired level of viscosity of thermoplastic resin 158 in a thermoplastic preform 156 to facilitate a substantially uniform distribution of the resin 158 throughout the fibrous material (not shown) of the preform 152 during consolidation thereof.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A method of inductive heating, comprising the steps of:
    applying alternating current to an induction coil having at least one susceptor face sheet mounted adjacent thereto, the susceptor face sheet being formed of an electrically conductive ferromagnetic alloy having a Curie temperature;
    generating a magnetic field;
    inductively heating the susceptor face sheet to a first equilibrium temperature approaching the Curie temperature in response to the magnetic field;
    adjusting at least one of a frequency and an amperage of the alternating current; and
    shifting the equilibrium temperature of the susceptor face sheet from the first equilibrium temperature to a second equilibrium temperature in response to adjusting at least one of the frequency and the amperage.

2. The method of claim 1 wherein the step of adjusting at least one of the frequency and the amperage comprises:
    adjusting the frequency of the alternating current in a manner causing the equilibrium temperature of the susceptor face sheet to shift by approximately 5 to 15 degrees Fahrenheit.

3. The method of claim 1 wherein the step of adjusting at least one of the frequency and the amperage comprises:
    adjusting the amperage of the alternating current; and
    shifting the equilibrium temperature of the susceptor face sheet from the first equilibrium temperature to the second equilibrium temperature.

4. The method of claim 1 wherein the step of adjusting at least one of the frequency and the amperage comprises:
    adjusting the frequency of the alternating current; and
    changing a heating rate of the susceptor face sheet.

5. The method of claim 1 wherein the step of adjusting at least one of the frequency and the amperage comprises:
    adjusting the amperage of the alternating current; and
    changing a heating rate of the susceptor face sheet.

6. The method of claim 1 further comprising the step of:
    applying a compressive force to a workpiece.

7. The method of claim 1 further comprising the step of:
    actively cooling the susceptor face sheet.

8. A method of inductively heating a workpiece, comprising the steps of:
    applying alternating current to an induction coil having a susceptor face sheet mounted adjacent thereto, the susceptor face sheet being formed of an electrically-conductive ferromagnetic alloy having a Curie temperature of the workpiece in contact with the susceptor face sheet;
    generating a magnetic field in response to the alternating current;
    inductively heating the susceptor face sheet at a first heating rate to a first equilibrium temperature approaching the Curie temperature in response to the magnetic field;
    conductively heating the workpiece in thermal contact with the susceptor face sheet;
    stabilizing the temperature of the susceptor face sheet at the first equilibrium temperature;
    adjusting at least one of a frequency and an amperage of the alternating current; and
    changing the first heating rate and/or the first equilibrium temperature of the susceptor face sheet to a second heating rate and/or a second equilibrium temperature in response to adjusting at least one of the frequency and the amperage of the alternating current.

* * * * *